United States Patent
Rai et al.

(10) Patent No.: US 8,873,551 B2
(45) Date of Patent: Oct. 28, 2014

(54) MULTI-DESTINATION FORWARDING IN NETWORK CLOUDS WHICH INCLUDE EMULATED SWITCHES

(75) Inventors: Smita Rai, Mountain View, CA (US); Gayatri Ramachandran, Sunnyvale, CA (US); Santosh Rajagopalan, San Francisco, CA (US); Chandan Mishra, Sunnyvale, CA (US); Sanjay Sane, Fremont, CA (US); Hariharan Balasubramanian, Oak Park, CA (US)

(73) Assignee: Cisco Technology, Inc., San Jose, CA (US)

( * ) Notice: Subject to any disclaimer, the term of this patent is extended or adjusted under 35 U.S.C. 154(b) by 310 days.

(21) Appl. No.: 12/848,048

(22) Filed: Jul. 30, 2010

(65) Prior Publication Data

US 2012/0027017 A1 Feb. 2, 2012

(51) Int. Cl.
*H04L 12/28* (2006.01)
*H04L 12/18* (2006.01)
*H04L 12/26* (2006.01)
*H04L 12/803* (2013.01)
*H04L 12/801* (2013.01)
*H04L 12/823* (2013.01)

(52) U.S. Cl.
CPC ............ *H04L 12/18* (2013.01); *H04L 12/1886* (2013.01); *H04L 43/50* (2013.01); *H04L 47/125* (2013.01); *H04L 47/15* (2013.01); *H04L 47/32* (2013.01)

USPC .......................................... 370/390; 709/232

(58) Field of Classification Search
None
See application file for complete search history.

(56) References Cited

U.S. PATENT DOCUMENTS

| 6,678,242 B1* | 1/2004 | Simon ........................... 370/218 |
| 2011/0235523 A1* | 9/2011 | Jha et al. ....................... 370/242 |
| 2011/0268125 A1* | 11/2011 | Vobbilisetty et al. ..... 370/395.53 |

OTHER PUBLICATIONS

Cisco, "Virtual PortChannels: Building Networks without Spanning Tree Protocol", Cisco Systems, Inc. White Paper, Jul. 2009.*

* cited by examiner

*Primary Examiner* — Khoa Huynh (74) *Attorney, Agent, or Firm* — Patterson + Sheridan, LLP (57) ABSTRACT

Techniques are described which facilitate multi-destination forwarding in a Layer 2 Multipath (L2MP) network which includes an emulated switch. The emulated switch may correspond to two or more underlying peer link switches in the L2MP network, in which each of the peer link switches is linked to a Classical Ethernet (CE) switch over a virtual port channel (vPC). Traffic received by one of the peer link switches over the vPC is automatically forwarded to the other peer link switch (or switches). Multi-destination frames originating from the L2MP network addressed to hosts within the CE network are sent over only one of the peer link switches.

21 Claims, 11 Drawing Sheets

MULTI-DESTINATION FORWARDING IN NETWORK CLOUDS WHICH INCLUDE EMULATED SWITCHES

TECHNICAL FIELD

Embodiments presented in this disclosure generally relate to computer networking, and more particularly, to multi-destination forwarding in network clouds which include one or more emulated switches.

BACKGROUND

Data center networks have become increasingly complex in order to support progressively more complicated switching and pathing topologies. For example, a Layer 2 network (i.e., an Ethernet network) may be configured to support multipathing between nodes in a data center network cloud. One emerging approach for allowing Layer 2 multipathing is TRILL, short for Transparent Interconnection of Lots of Links. A standards-compliant TRILL cloud configured using a standards-compliant IS-IS protocol (intermediate switch to intermediate switch) supports multipathing between nodes of the network cloud. At the juncture of such a network cloud with a Classical Ethernet (CE) network, the multipathing benefits should ideally be extended to the CE switches. However, when a CE switch is dual-homed (or multi-homed) to two (or more) nodes in the TRILL cloud, in a pure spanning tree network, all but one of the links to the TRILL cloud may be blocked, leading to inefficient link utilization. That is, even though a CE switch may include links to multiple switches in the TRILL cloud, spanning tree may block one (or more) of the links from being used to prevent loops in a Layer 2 network traffic.

Technologies such as virtual Port Channel (vPC) alleviate some of these inefficiencies in a CE cloud and allow dual-homed hosts connected to multiple aggregation switches to use all the links by creating a single logical port channel that includes a physical link to each switching device within the cloud. Thus, with vPC, multipathing support may be extended to a CE cloud. Traffic from the CE device, originating from the same MAC, can be load balanced and land on different switches in the TRILL cloud and forwarded. That is, while the CE switch treats multiple, physical links as a single port channel (with respect to spanning tree), the CE switch may load balance traffic into the cloud over the underlying physical links to different TRILL switches. As a result, connecting a CE device through a virtual port-channel to multiple TRILL switches creates important challenges for other switches within the network cloud. For example, with optimized MAC-learning, nodes behind the virtual port channel inside the TRILL cloud could see the MAC address flip-flop as being learned off one TRILL switch and then off the other as traffic is load-balanced across the two.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DESCRIPTION

Overview

Embodiments disclosed herein provide methods, systems and computer program products for forwarding multi-destination traffic (e.g., multicast and broadcast frames) in network clouds which include emulated switches. One embodiment described herein includes a method. This method may generally include receiving, at a first peer link switch, a network packet having a multi-destination address as a destination address, forwarding the network packet over one or more links connecting the first peer link switch to one or more nodes of a Layer 2 multipath (L2MP) network, and forwarding the network packet over a peer link connecting the first peer link switch to a second peer link switch. The first peer link switch and the second peer link switch are each connected to a Classical Ethernet (CE) switch over a virtual port channel and the second peer link switch is configured to forward the network packet over one or more links connecting the second peer link switch to one or more nodes of the L2MP network. Additionally, each of the one or more nodes of the L2MP network to which the network packet is forwarded performs an incoming interface check on the forwarded network packet.

Another embodiment includes a computer-readable storage medium storing code for execution by a central processing unit (CPU), wherein the code, when executed by the CPU, performs an operation for processing network frames in a Layer 2 multipath (L2MP) network. The operation itself may generally include receiving, at a first peer link switch, a network packet having a multi-destination address as a destination address, forwarding the network packet over one or more links connecting the first peer link switch to one or more switching nodes of the L2MP network, and forwarding the network packet over a peer link connecting the first peer link switch to a second peer link switch. The first peer link switch and the second peer link switch are each connected to a Classical Ethernet (CE) switch over a virtual port channel and the second peer link switch is configured to forward the network packet over one or more links connecting the second peer link switch to one or more nodes of the L2MP network. Additionally, each of the one or more nodes of the L2MP network to which the network packet is forwarded performs an incoming interface check on the forwarded network packet.

Still another embodiment includes a system. The system may generally include a first peer link switch comprising at least a processor and a memory. The first peer link switch may be configured to perform an operation for processing a network packet. The operation of the first peer link switch may generally include receiving a network packet having a multi-destination address as a destination address, forwarding the network packet over one or more links connecting the first peer link switch to one or more nodes of a Layer 2 multipath (L2MP) network, and forwarding the network packet over a peer link connecting the first peer link switch to a second peer link switch. The second peer link switch may comprise at least a processor and a memory. The first peer link switch and the second peer link switch may each be connected to a Classical Ethernet (CE) switch over a virtual port channel. Further, the second peer link switch may be configured to perform an operation for processing the network frame received over the peer link. The operation of the second peer link switch may include forwarding the network packet over one or more links connecting the second peer link switch to one or more nodes of the L2MP network. Each node of the L2MP network to which the network packet is forwarded performs an incoming interface check on the forwarded network packet.

Yet another embodiment includes a method that generally includes receiving, at a first Layer 2 multipath (L2MP) switch configured as a first peer in an emulated switch, a frame having a multi-destination address as a destination address. Further, at least one host to which the frame is forwarded is reachable over a virtual port channel (vPC) connecting the first L2MP switch to a Classical Ethernet (CE) device. Upon determining the first L2MP switch is configured as a designated forwarder for the emulated switch for multi-destination traffic sent over the vPC, the frame is forwarded over the vPC from the first L2MP switch towards the at least one host. This method may also include forwarding the frame to a second Layer 2 multipath (L2MP) switch configured as a second peer in the emulated switch.

Description of Example Embodiments

Embodiments described herein provide techniques which facilitate multi-destination forwarding in a Layer 2 multipath network which includes an emulated switch. The emulated switch may correspond to one or more underlying peer link switches in the Layer 2 multipath network, in which each of the peer link switches is linked to a Classical Ethernet (CE) switch. In particular, the emulated switch may be part of a Layer 2 multipathing network cloud, e.g., a standards-compliant TRILL cloud configured using a standards-compliant IS-IS protocol. Without requiring any new constraints in the shortest path first computation of a forwarding graph for any particular switch in the TRILL could, embodiments described herein provide multicast forwarding correctness for a virtual port channel (vPC)/Emulated-switch scenario.

As noted above, connecting a CE device through a virtual port-channel to multiple TRILL switches creates important challenges of its own for other switches within the network cloud. For example, with optimized MAC-learning, nodes behind the virtual port channel in the TRILL cloud may see the MAC address flip-flop as being learnt off one TRILL switch and then off the other as traffic is load-balanced across the two. That is, packets from the same CE cloud (and same source MAC) can land on different switches over the virtual port channel. As these packets are then forwarded to other switches in the network cloud, such switches will source-learn the MAC address as being on different links as they learn it from one switch providing part of a vPC and then on another.

Figure 1A:
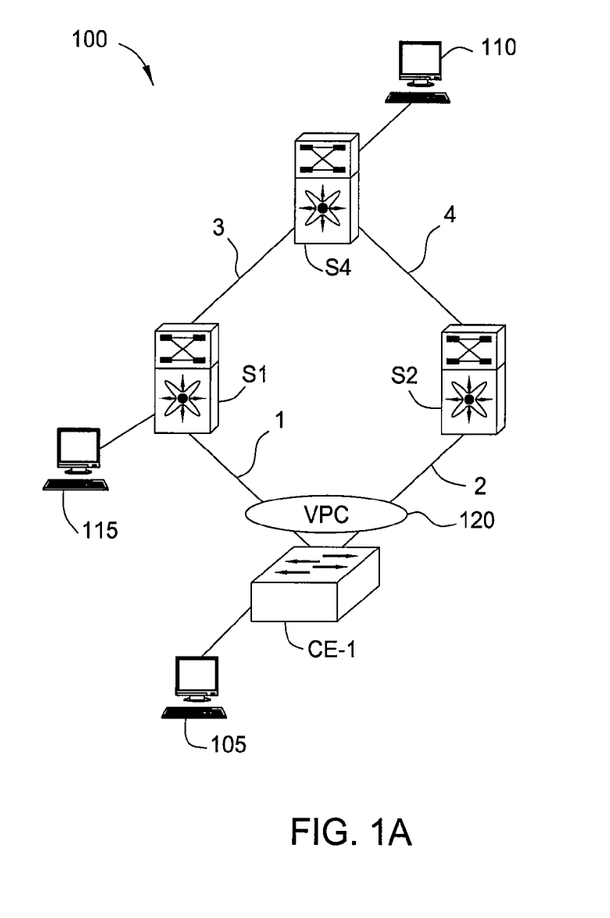
FIGS. 1A-1B illustrate an example network computing infrastructure connecting a classical Ethernet (CE) device to a Layer 2 multipath network, according to certain embodiments of the present disclosure.

For example, FIG. 1A illustrates an example network computing infrastructure 100 connecting a CE switch CE-1 to a Layer 2 multipath network. In this example, a virtual port channel (vPC) 120 includes a link 1 to a multipath switch S1 and a link 2 to a multipath switch S2. In turn, switch S1 is connected to a switch S4 over link 3. Switch S2 is also connected to switch S4 over link 4. Additionally, a host 105 is connected to CE switch CE-1, a host 115 is connected to switch S1 and a host 110 is connected to switch S4. The virtual port channel 120 allows Layer 2 traffic to be load balanced over both link 1 and link 2, despite the presence of a loop resulting from links 1, 2, 3, and 4. Thus, traffic from host 105 (having a given MAC address) may be sent to either switch S1 or switch S2. However, assuming the traffic has a destination address of host 110, such traffic can arrive at switch S4 over link 3 (from switch S1) or over link 4 (from switch S2). This results in a MAC address flip/flop on switch S4.

Figure 1B:
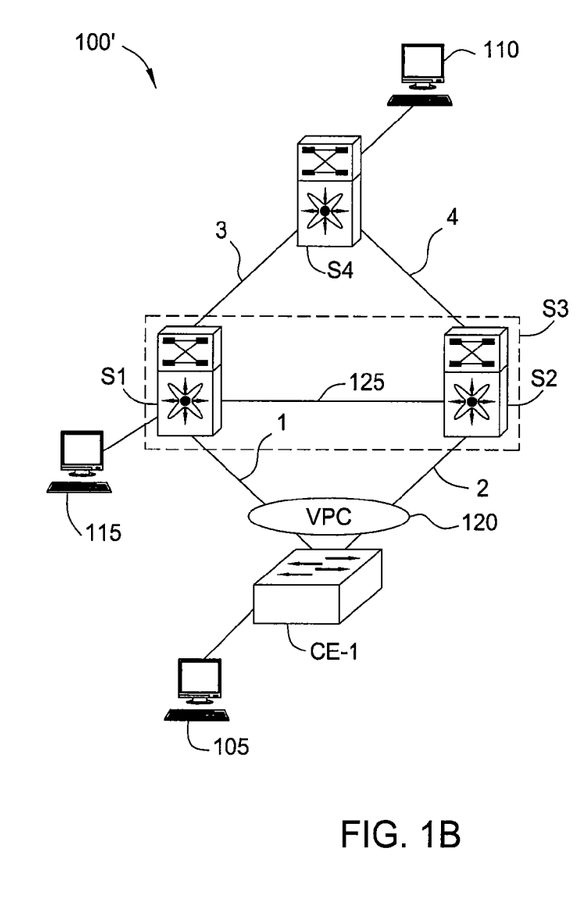

To address this issue, an emulated switch may be introduced behind the vPC port-channel 120. For example, FIG. 1B illustrates an example network computing infrastructure 100' in which switch S1 and switch S2 are used to provide an emulated switch S3. As shown, a peer link 125 provides a direct connection between S1 and S2. In one embodiment, packets entering on the virtual port-channel 120 are marked with an emulated switch identifier (S3 in this example) and sent to other switches in the Layer 2 multipath network as originating from switch S3 (which is reachable from the actual TRILL nodes to which the CE device CE-1 is dual-homed, i.e., switches S1 and S2). This pair of switches (S1 and S2) may be referred to as "emulating switch peers." At the same time, traffic originating from host 115 is still marked as originating from switch S1, as traffic from host 115 is not sent over the virtual port channel 120.

As noted, traffic from host 105 (having a given MAC address) may be sent to either switch S1 or switch S2. Assuming the traffic has a destination address of host 110, such traffic now arrives at switch S4 as originating from switch S3, regardless of whether sent over link 3 (from switch S1) or over link 4 (from switch S2). Thus, no MAC address flip/flop occurs on switch S4, as S4 views host 105 as being reachable over emulated switch S3, without any awareness that S3 is, in fact, an emulated switching node. However, using the emulated switch S3 opens up another challenge, since nodes in the interior of the Layer 2 multipath cloud (e.g., switch S4) may be configured to perform some form of Incoming Interface Check (IIC) for accepting multi-destination packets (e.g., multicast or broadcast traffic) from switches only on certain links, to prevent transient loops. For example, for frames marked as originating from the emulated switch S3, it may appear at switch S4 from either of the two emulating switch peers (S1 and S2), and so the switch S4 needs to open the IIC for emulated switch S3.

Embodiments described herein provide techniques that multi-destination traffic forwarding in Layer 2 multipath networks, (e.g., a standards-compliant TRILL network cloud) which include an emulated switch to be correctly processed. In one embodiment, northbound traffic marked with an emulated switch identifier (i.e., as originating from S3) reaches each connected switch (e.g., s4), which may be oblivious to the concept of emulated switch, along the path they would expect it to arrive according to their IIC table (i.e., either Link 3 or Link 4). Note, as used in this example, "northbound traffic," generally refers to multi-destination network packets originating from the CE network CE-1 forwarded into the Layer 2 multipath network cloud. In the other direction, when southbound multi-destination traffic lands on emulating switch peers (S1 and S2), only one of the two switches forwards it to the CE device CE-1, to avoid duplicates. Note, as used in this example, "southbound traffic" refers to network packets originating from the Layer 2 multipath network addressed to hosts within the CE network CE-1.

To achieve the correct multi-destination forwarding from emulated switch S3, the peer link 125 is used to directly connect switch S1 to switch S2 and used as a backplane link between the emulating switch pairs. An incoming interface check may be enabled on the peer link port, so that S1 and S2 always accept traffic with the emulated switch identifier (S3) as the source on the peer link port. At the same time, the emulated switch IIC may be disabled on any other core ports on the emulated peers S1 and S2), so that a packet with source as the emulated switch S3 is not accepted on anything other than the peer link 125. The forwarding graph for multi-destination packets at the emulating switch peers (S1 and S2) is updated with this peer link port-channel. Doing so results in all multi-destination packets ingressing through the emulated switch ports (i.e., over link 1 or link 2 of vPC 120) always reaching both S1 and S2, which forward the packets out into the Layer 2 multipath cloud according to the ports they have computed, without affecting the graph computed at any other TRILL node. Switch S4 then receives a multi-destination packet over the link which the IIC on switch S4 will allow, while discarding instances of the multi-destination packet received over other links.

Additionally, one of the emulated switch peers (S1 or S2) may be selected as a designated forwarder for southbound multi-destination traffic. That is, for each emulated switch port (e.g., link 1 and link 2), one of the emulating switch peers is elected as the forwarder and forwards all southbound traffic originating from the Layer 2 multipath cloud, while the other emulating switch peer drops it at the egress of these emulated switch ports.

Figure 2:
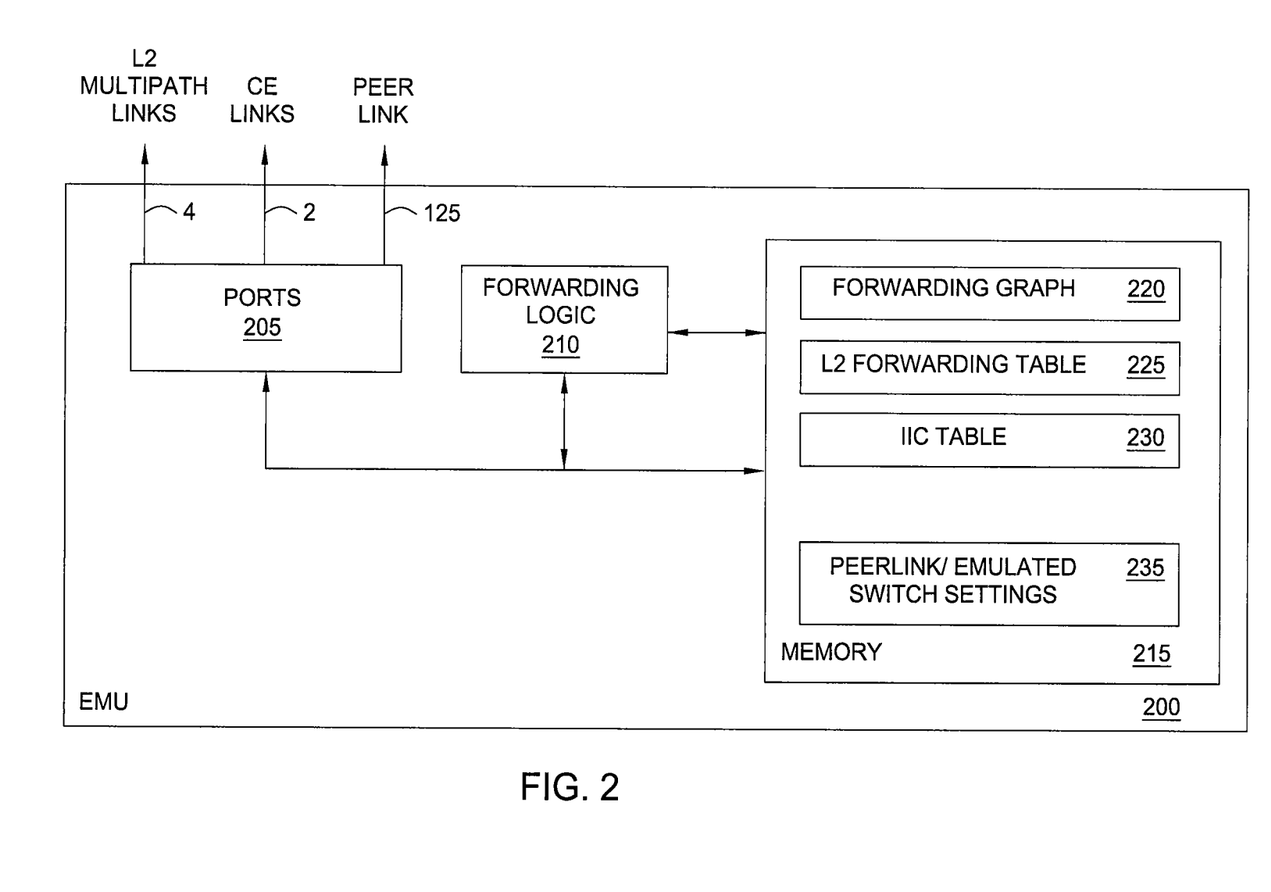
FIG. 2 is a block diagram illustrating an example of a switching device, according to certain embodiments of the present disclosure.

FIG. 2 is a block diagram illustrating an example of a switching device, according to certain embodiments of the present disclosure. As shown in FIG. 2, the routing device 200 includes ports 205, a central processing unit (CPU)/forwarding logic 210, and memory 215. Of course, one of ordinary skill in the art will recognize that the depiction of a switching device 200 shown in FIG. 2 is simplified to highlight aspects of the embodiments described herein and further, that, in practice, network devices may be configured with a variety of additional functions, features and components.

In this example, ports 205 include Layer 2 multipath link 4, classical Ethernet (CE) link 2, and a peer link 125. Thus, Switching device 200 generally corresponds to the switch S2 of FIGS. 1A-1B. As described above, the Layer 2 multipath link 4 connects switching device 200 to other switches within a network cloud (e.g., switch S4), CE link 1 connects switching device 200 to a classical Ethernet CE-1 using, e.g., as part of a virtual port channel (vPC) 120, and peer link 125 connects switching device 200 to an emulating switch pair (e.g., switch S1).

The forwarding logic 210 is generally configured to evaluate network packets received over one of the ports 205 and selectively forward the packets over one or more other ports on the switching device (or drop them). As shown, the memory 215 includes a variety of structures used by the forwarding logic 210 to make a forwarding decision. Illustratively, the memory 215 includes a forwarding graph 220, a Layer 2 forwarding table 225, an incoming interface check (IIC) table 230, and peer link/emulated switch settings 235. The forwarding graph 220 provides definition for or more forwarding hierarchies used by switch 200 to route traffic within a Layer 2 multipath network. That is, each of the nodes in a Layer 2 multipath network may be reached over multiple paths, and each path may be defined by an independent (and non-looping) forwarding graph 240. In one embodiment, traffic flows created in the Layer 2 multipath network are assigned to use one of the forwarding graphs 220. Once assigned, traffic from a flow colored as using a particular forwarding graph 220 is then forwarded according to that forwarding graph 220. The Layer 2 forwarding table 225 is used record reachability for network addresses. As is known, when the switching device 200 receives a frame over one of the ports 205, the source address in that frame is added to the Layer 2 forwarding table 225 (if not present) to indicate over which port a given host may be reached. That is, the forwarding table 210 generally provides a lookup table mapping ports on the device 200 to the address of a device connected to a given port (e.g., mapping a port ID to a MAC address of a network interface card). In one embodiment, the forwarding table 210 may be implemented as a ternary content addressable memory (TCAM) and the memory 205 may be any combination of fixed or removable memory chips or modules (e.g., DRAM, SDRAM, SRAM).

The IIC table 230 is used by the switching device to determine whether a frame received over a given link port, colored as being associated with one of the forwarding graphs 220, is allowed on that link port. If so, the frame is accepted and forwarded, otherwise the frame is dropped. As described in greater detail below, the IIC table 230 is used by the emulating peer switches (switches S1 and S2) to allow multi-destination traffic to be forwarded over the peer link 125 to one another. And in turn, an IIC table on switches connected to switch 200 (e.g., switch S4 connected on Layer 2 multipath links 3, 4) is used to decide which link to accept a multi-destination packet, when received by a switch in the Layer 2 multipath cloud. The peer link/emulated switch settings 235 specify configuration settings for the switching device 200. In context of this disclosure, e.g., the settings 235 may specify that switching device 200 is one switch of a emulated switch pair for a virtual port channel (vPC) and/or specify whether switching device 200 is a designated forwarder for multi-destination traffic sent over a (vPC) link connecting a classical Ethernet (CE) switch to a Layer 2 multipath network.

Figure 3:
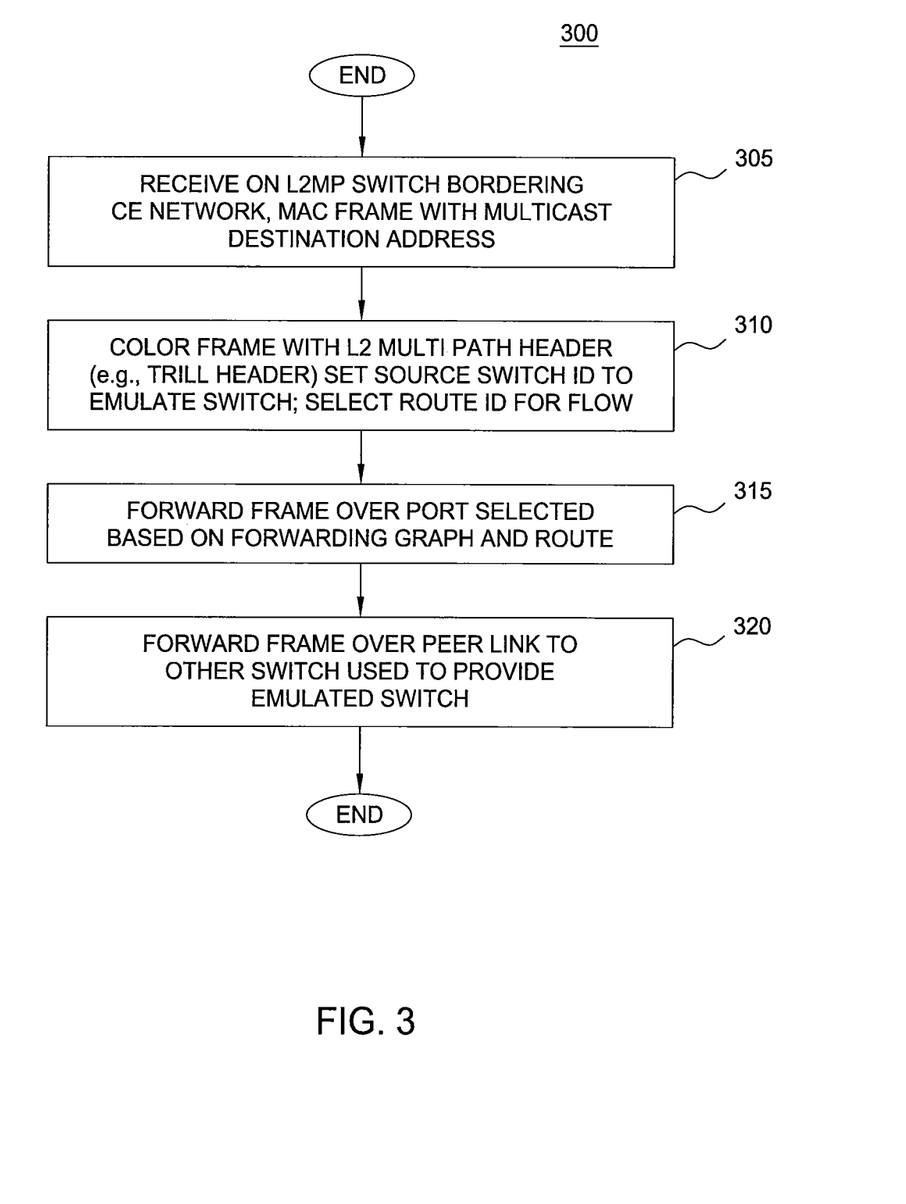
FIG. 3 illustrates a method for a peer switch to process a network frame received from a CE device, according to certain embodiments of the present disclosure.

FIG. 3 illustrates a method 300 for a peer switch to process a network frame received from a classical Ethernet (CE) device, according to certain embodiments of the present disclosure. More specifically, method 300 illustrates a method for processing a multi-destination packet sent from a CE device to hosts accessed over a Layer 2 multipath network, i.e., for processing "northbound" multi-destination traffic.

As shown, the method 300 begins at step 305 where a Layer 2 multipath (L2MP) switch receives a packet having multi-destination destination address. For example, a host attached to a CE switch may send a frame with a multicast (or broadcast) address towards a group of hosts connected to an L2MP cloud. Further, in one embodiment, the CE switch may be connected to multiple L2MP switches over a virtual port channel (vPC). In such a case, the CE switch may select one of multiple links over which to forward the multi-cast frame.

At step 310, the receiving L2MP switch may add an L2 multipath header (e.g., a TRILL header) to the frame. Such a header may indicate a selected one of the multipath routes to use in forwarding the packet over the L2MP network. That is, the receiving switch may select one of the available forwarding graphs and add an identifier representing the selected graph to the multipath header. Additionally, the receiving peer switch may add an indication of a switch ID of the emulated switch to the multipath header. As noted above, doing so prevents other switches in the L2MP cloud from flip/flopping MAC addresses as the CE switch sends traffic over different links of a virtual port channel (i.e., to the peer switches providing the emulated switch). At step 315, the receiving peer switch forwards the frame over one or more ports based on the forwarding graph, selected multi-path route, and the multi-cast destination address. At step 320, the receiving peer switch also forwards the frame to the other peer switch over a direct peer switch link.

Figure 4A:
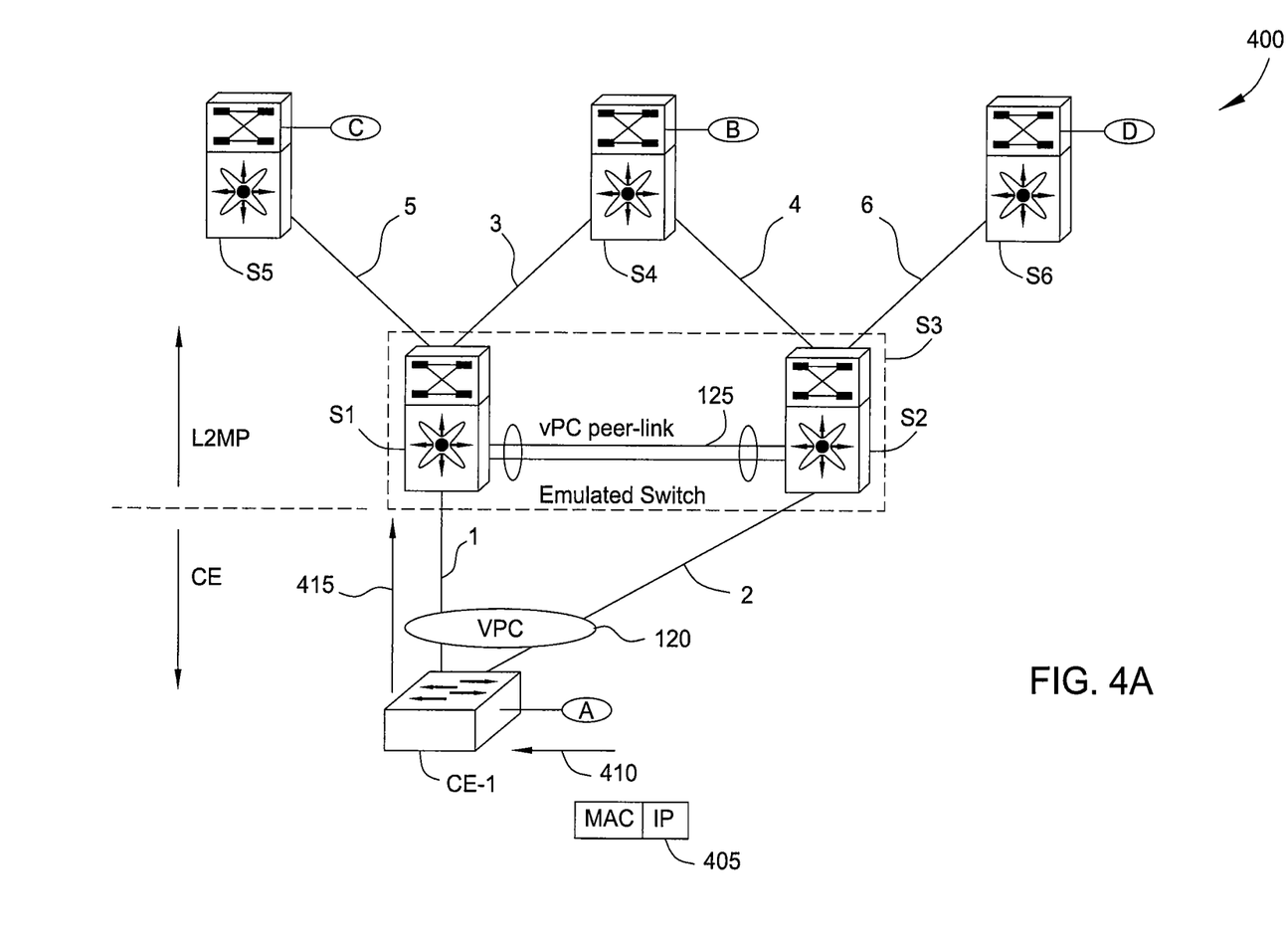
FIGS. 4A-4C further illustrate the methods of FIG. 3 using an example network computing infrastructure connecting a classical Ethernet (CE) device to a Layer 2 multipath network, according to certain embodiments of the present disclosure.
Figure 4B:
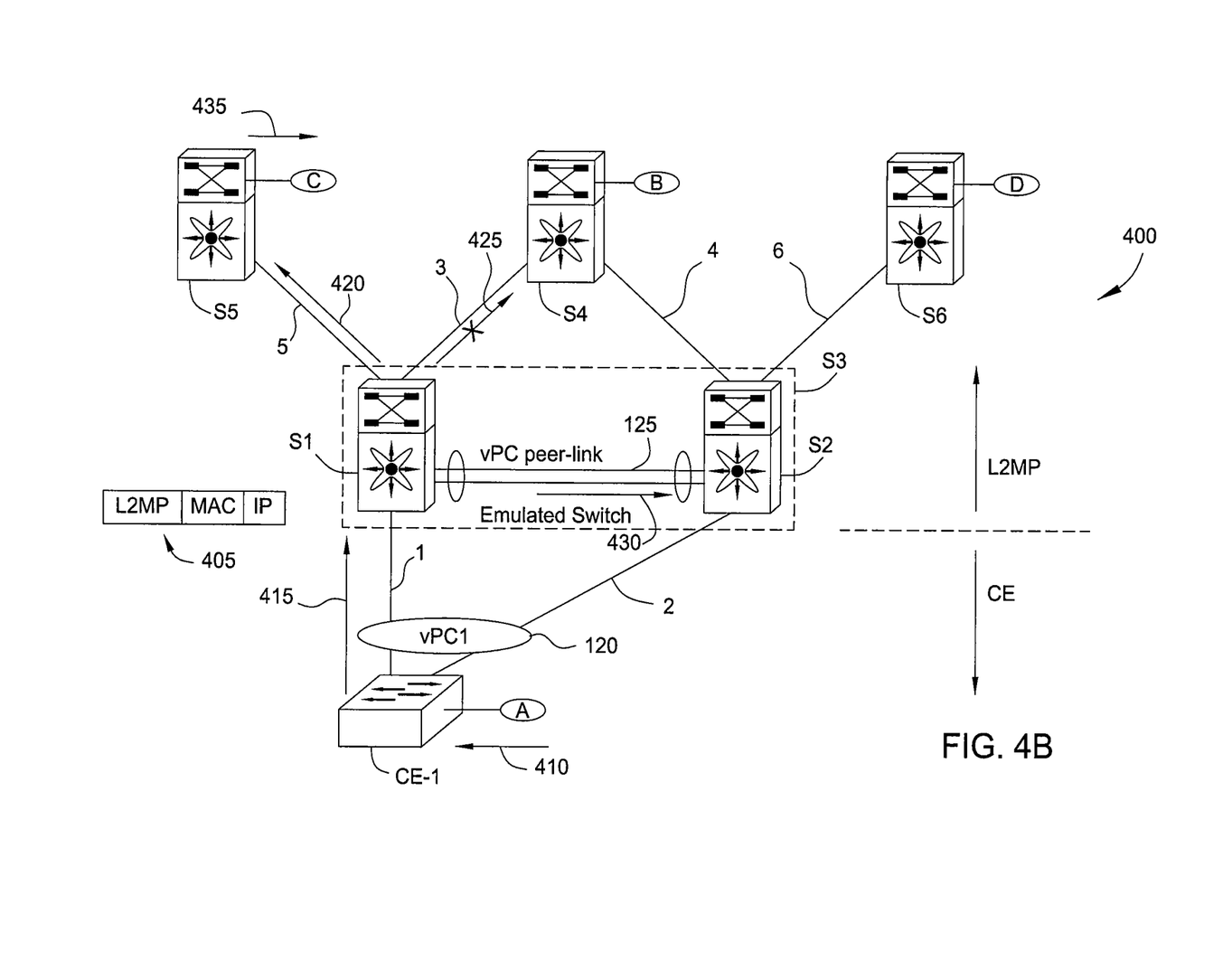

FIGS. 4A-4B further illustrate steps of method 300. First, FIG. 4A shows a classical Ethernet switch CE-1 connected to an emulated switch S3 over a virtual port channel 120. Specifically, switch CE-1 is connected to peer switches S1 and S2 over links 1 and 2, respectively. Peer switches S1 and S2 include a peer link 125 to one another, as well as connections to other nodes in an L2MP network 400. In this example, peer switch S1 is connected to switch S5 over link 5 and to switch S4 over link 3. Peer switch S2 is connected to switch S4 over link 4 and to switch S6 over link 6. Note, in this topology switch S4 includes two links to the emulated switch S3, one to peer switch S1 over link 3 and one to peer switch S2 over link 4. Assume host A (connected to CE-1) sends a frame 405 with a multi-cast destination address to a group of hosts which includes host B (connected to switch S4) and host C (connected to switch S5). An arrow 410 shows packet 405 sent to the switch CE-1. Upon receipt, the switch CE-1 forwards frame 405 over one of the links 1, 2 of the vPC 120. In this example, assume switch CE-1 selects peer switch S1 and forwards the frame 405 over link 1, represented in FIG. 4A using an arrow 415.

Figure 5:
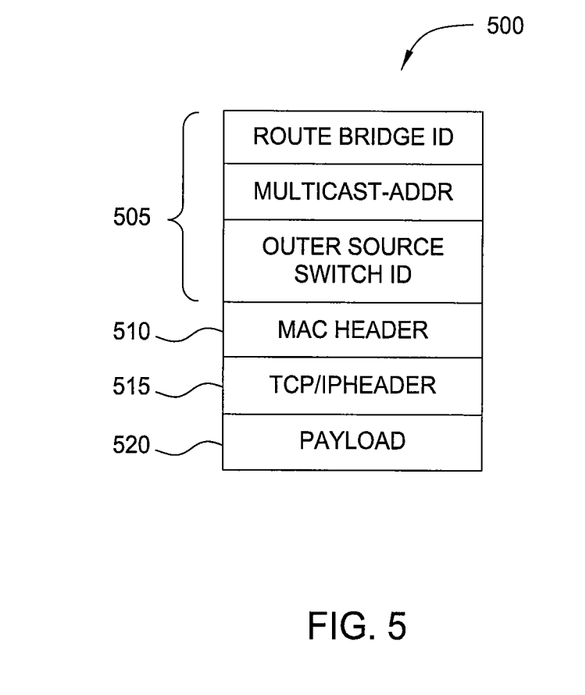
FIG. 5 illustrates an example structure for a Layer 2 multipath network frame, according to certain embodiments of the present disclosure.

FIG. 4B shows the forwarding of frame 405 by the peer switch S1. First, peer switch S1 colors the CE frame 405 with a Layer 2 multipath (L2MP) header. FIG. 5 illustrates an example structure for a Layer 2 multipath network frame 500, according to certain embodiments of the present disclosure. As shown, the frame 500 includes a MAC header 510, TCP/IP header 515, and a payload 520. That is, frame 500 includes the sections of a classical Ethernet frame. Frame 500 also includes a L2MP header 505. Illustratively, the L2MP header 505 includes a route bridge ID, i.e., an indication of the selected multipath route used for frame 500, a multi-cast address indicating a MAC address to which the frame 500 is being forwarded, and an outer source switch ID. In the present example, the outer source switch ID corresponds to the switch ID of the emulated switch (i.e., emulated switch S3).

Returning to FIG. 4B, once encapsulated with the L2MP header, peer switch S1 proceeds to forward the packet 405 based on the forwarding graph, a selected multi-path route, and the multi-cast destination address specified in the L2MP header. In this example, peer switch S1 forwards the packet over link 5 towards switch S5 (shown by an arrow 420), ultimately to a host C (shown by an arrow 435). Peer switch S1 also forwards the frame 405 over the peer link 125 to peer switch S2, i.e., to the other physical switch that is part of the emulated switch S3 (shown by an arrow 430) and to switch S4 (shown by an arrow 425). For this example, assume that an IIC table on switch 4 specifies link 4 as the link over which traffic from emulated switch S3 may be accepted (for the route specified in the L2MP header encapsulating frame 405), even though the forwarding graph for the selected route includes link 3. In such a case, switch S4 drops frame 405 as a result of the incoming interface check (represented by the X in arrow 425). However, the peer switch S1 also forwarded the frame 405 over the peer link of the emulated switch S3 to peer switch S2. Once received by peer switch S2, the frame 405 may be forwarded over additional links associated with the selected multi-path route.

Figure 7:
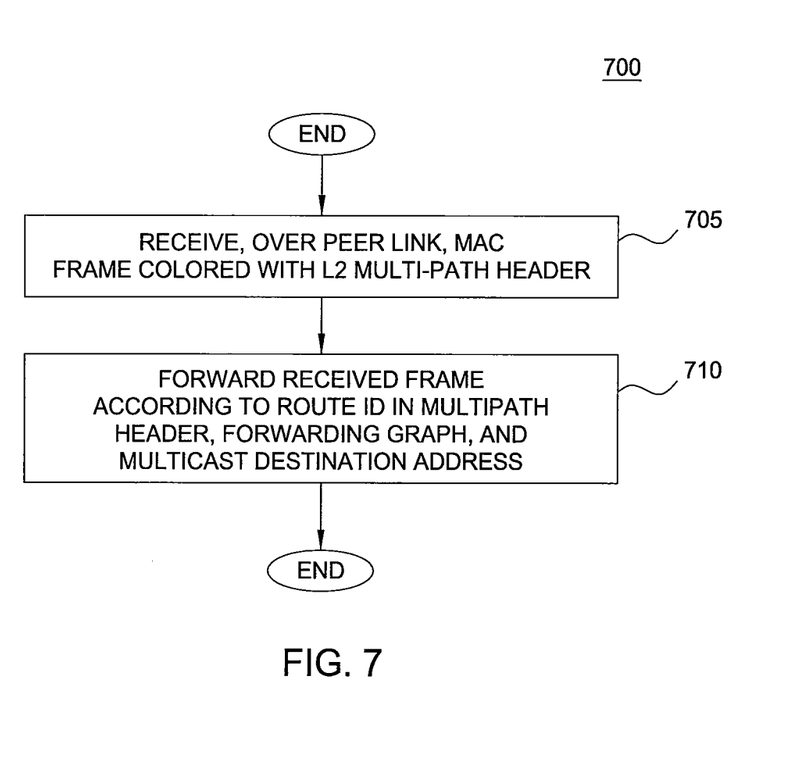
FIG. 7 illustrates a method for a peer switch to process a network frame received over a peer link from another peer switch, according to certain embodiments of the present disclosure.

For example, FIG. 7 illustrates a method 700 for a peer switch to process a network frame received over a peer link from another peer switch, according to certain embodiments of the present disclosure. As shown, the method 700 begins at step 705 where the peer switch receives a MAC frame colored with an L2MP header over the peer link connecting the receiving peer switch to the sending peer switch. And at step 710, forwards the frame received over the peer link according to the selected route ID in the L2MP header, forwarding graph, and destination address in the L2MP header.

Figure 4C:
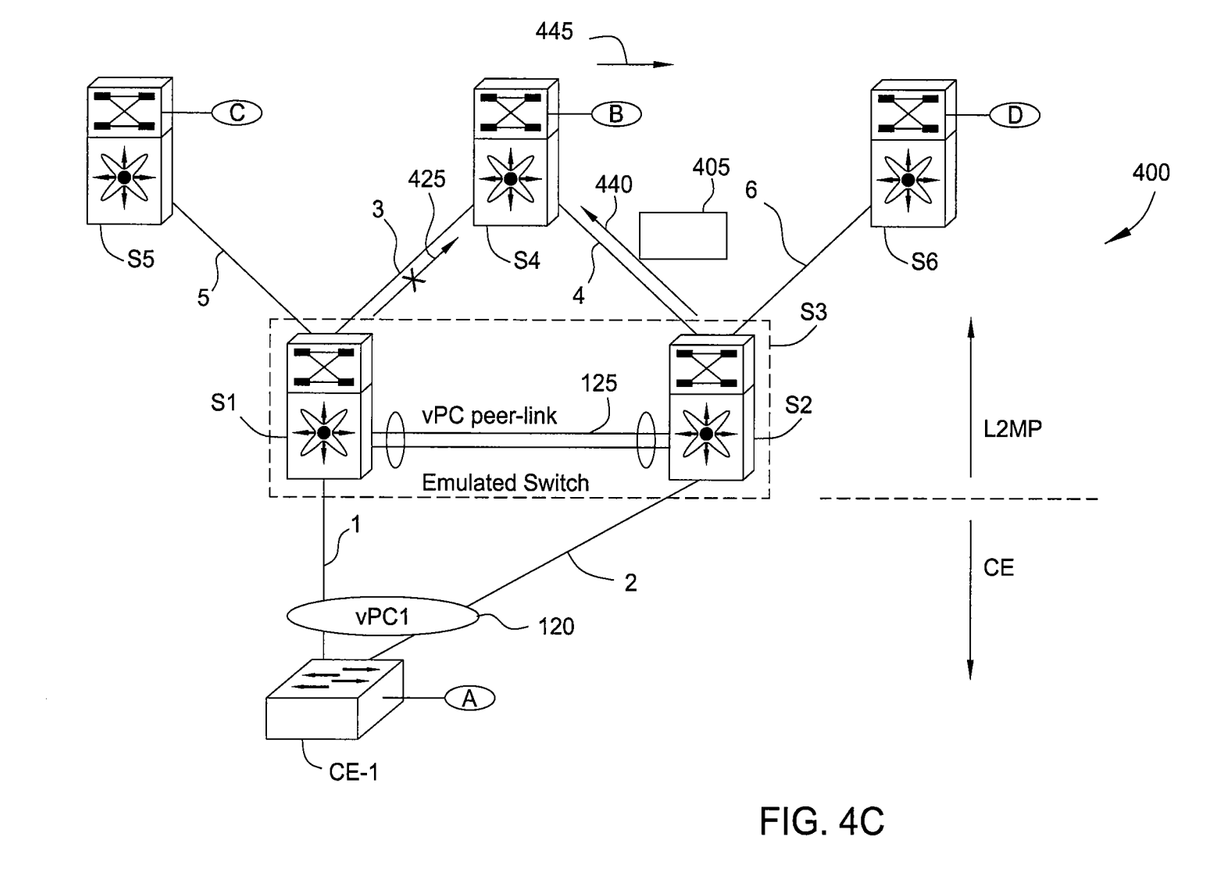

FIG. 4C further illustrates steps of method 700. Specifically, FIG. 4C illustrates the peer switch S2 processing the frame 405 after it is received from the peer switch S1 over the peer link 125. As shown, the peer switch S2 forwards the frame 405 over link 4 towards switch S4. However, unlike the frame forwarded by S1 over link 3, the incoming interface check (IIC) performed on frame 405 sent by the peer switch S2 over link 4 results in frame 405 being accepted by switch S4 (shown by arrow 440). Once received, switch S4 forwards the frame to the host C (shown by an arrow 445). Thus, even though switch CE-1 originally selected to load-balance frame 405 by sending it to peer switch S1, configuring the peer switches S1 and S2 to each forward traffic received over the vPC 120 to the other peer switch ensures that each node in the L2MP network cloud will receive frame 405 from an emulating switch peer that will satisfy an IIC check. In this particular example, switch S4 receives frame 405 over link 3 (which is dropped by the IIC check) and over link 4 (which is allowed by the IIC check), as switch S4 believes the emulated switch S3 is reachable over link 4, based on the forwarding graph.

Figure 6:
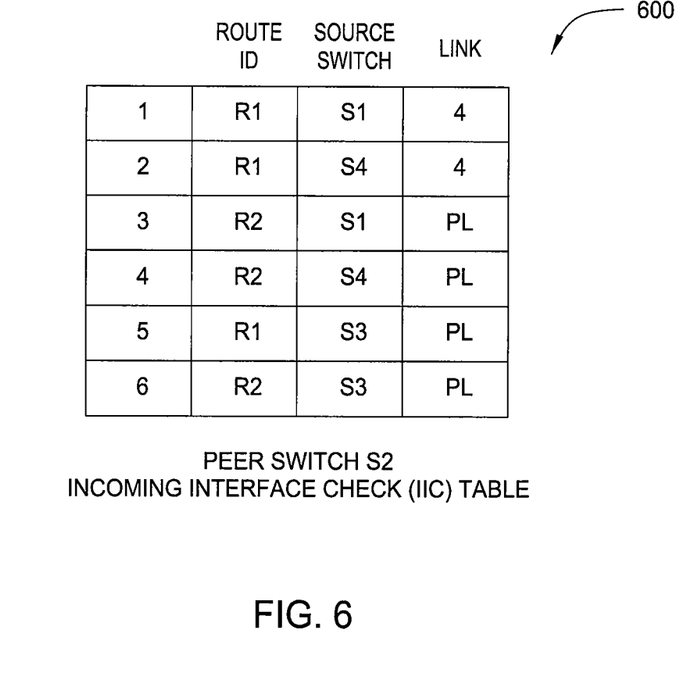
FIG. 6 illustrates an example incoming interface check table used by a switching device in a multipath network to determine whether to accept an incoming frame, according to certain embodiments of the present disclosure.

FIG. 6 illustrates an example IIC table 600 used by a switching device in a multipath network to determine whether to accept an incoming frame, according to certain embodiments of the present disclosure. Specifically, IIC table 600 corresponds to the IIC table present on peer switch S2 of the emulated switch S3 shown in FIGS. 4A-4C. IIC table 600 includes entries for two routes, identified using route IDs of R1 and R2. Each entry in IIC table 600 specifies a route ID and an originating source switch. Each entry in IIC table 600 also specifies a link over which a frame having a given route ID and originating source switch may be accepted. For example, the first entry specifies frames arriving at peer switch S2 (i) that are colored as being on route R1 and (ii) that have an originating source switch of S1, are allowed over link 4 (i.e., over the link between switch S2 and switch S4). The IIC table 600 also includes entries for traffic labeled as originating from the emulated switch S3, even though switch S2 may itself label traffic as originating from S3 when received over link 2 of the vPC link 120. Specifically, entries 5 and 6 indicate that traffic labeled as originating from switch S3 (the emulated switch) is allowed over the peer link for both routes R1 and R2. Accordingly, when the peer switch S1 receives traffic from switch CE-1, and labels it as originating from S3 to avoid MAC flip/flops on other L2MP switches, such a frame will pass the IIC check when forwarded to peer switch S2.

Figure 8:
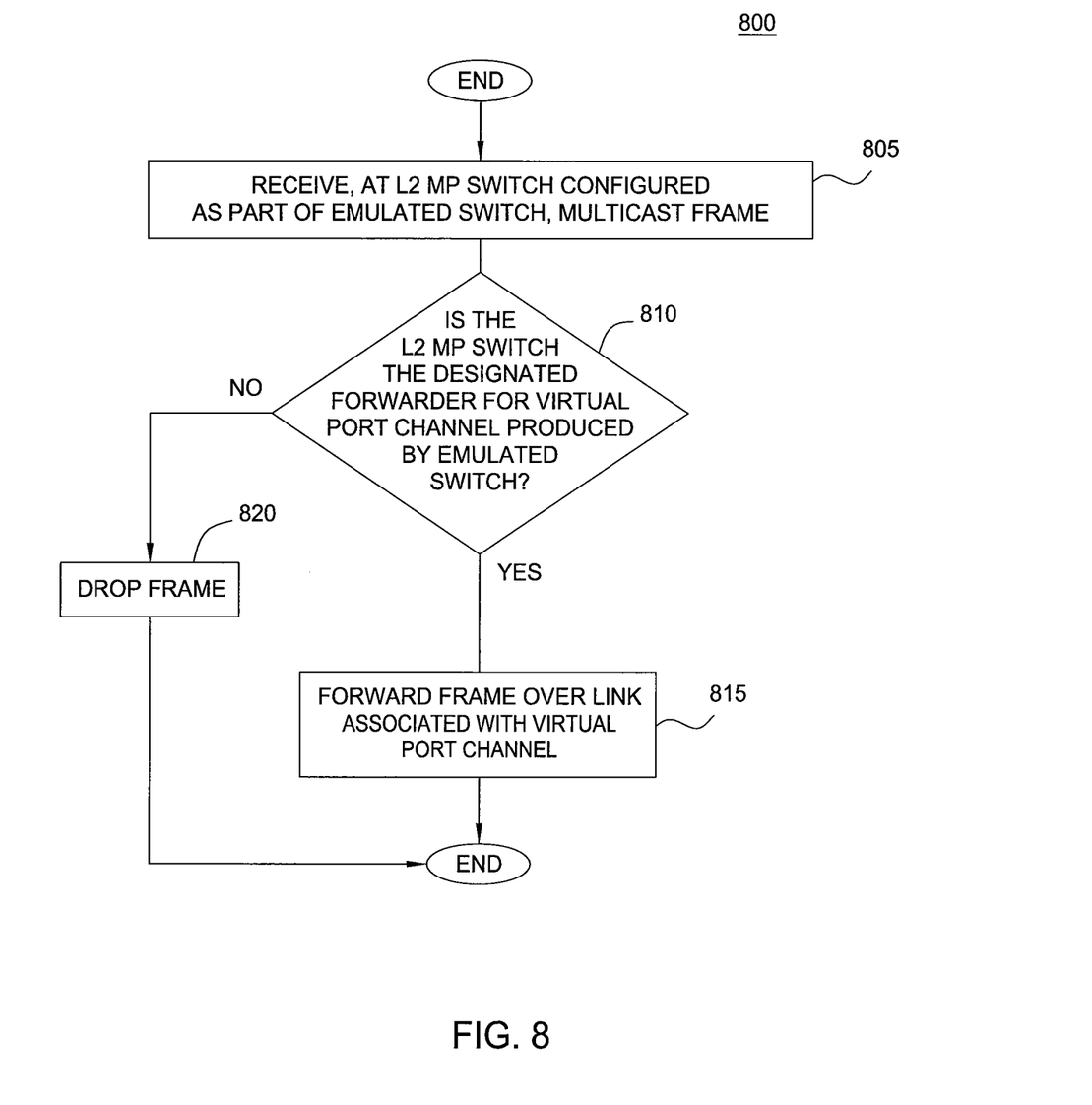
FIG. 8 illustrates a method for a host attached to a Layer 2 multipath network to send a multicast frame to a host connected to a classical Ethernet device, according to certain embodiments of the present disclosure.

In addition to correctly forwarding multi-destination traffic received from a CE network, in the presence of emulated switches, embodiments described herein also correctly forward multi-destination traffic in the other direction. For example, FIG. 8 illustrates a method 800 for a host attached to a Layer 2 multipath (L2MP) network to send a multicast (or broadcast) frame to hosts connected to a classical Ethernet (CE) device, according to certain embodiments of the present disclosure. More specifically, method 800 illustrates a method for processing a multi-destination packet sent from a Layer 2 multipath network to CE device, i.e., for processing "southbound" multi-destination traffic that passes through an emulated switch providing a virtual port channel connecting a CE device to the L2MP network.

As shown, the method 800 begins at step 805, where an L2MP switch configured as part of an emulated switch receives a multicast frame. The multicast frame may have a destination address of a host believed to be reachable over a vPC link connecting the receiving switch to a CE device. At step 810, the receiving L2MP switch determines whether it is the designated forwarder for multi-destination traffic sent to hosts over the vPC link of the emulated switch. If not, at step 820, the receiving L2MP switch drops the frame. Otherwise, if the L2MP switch receiving the L2 multicast frame is the designated forwarder, then it forward the frame over the link associated with the virtual port channel. Note, unlike frames received from the CE device, frames received from other nodes in the L2MP network addressed to the CE device need not be forwarded over the peer link.

Figure 9A:
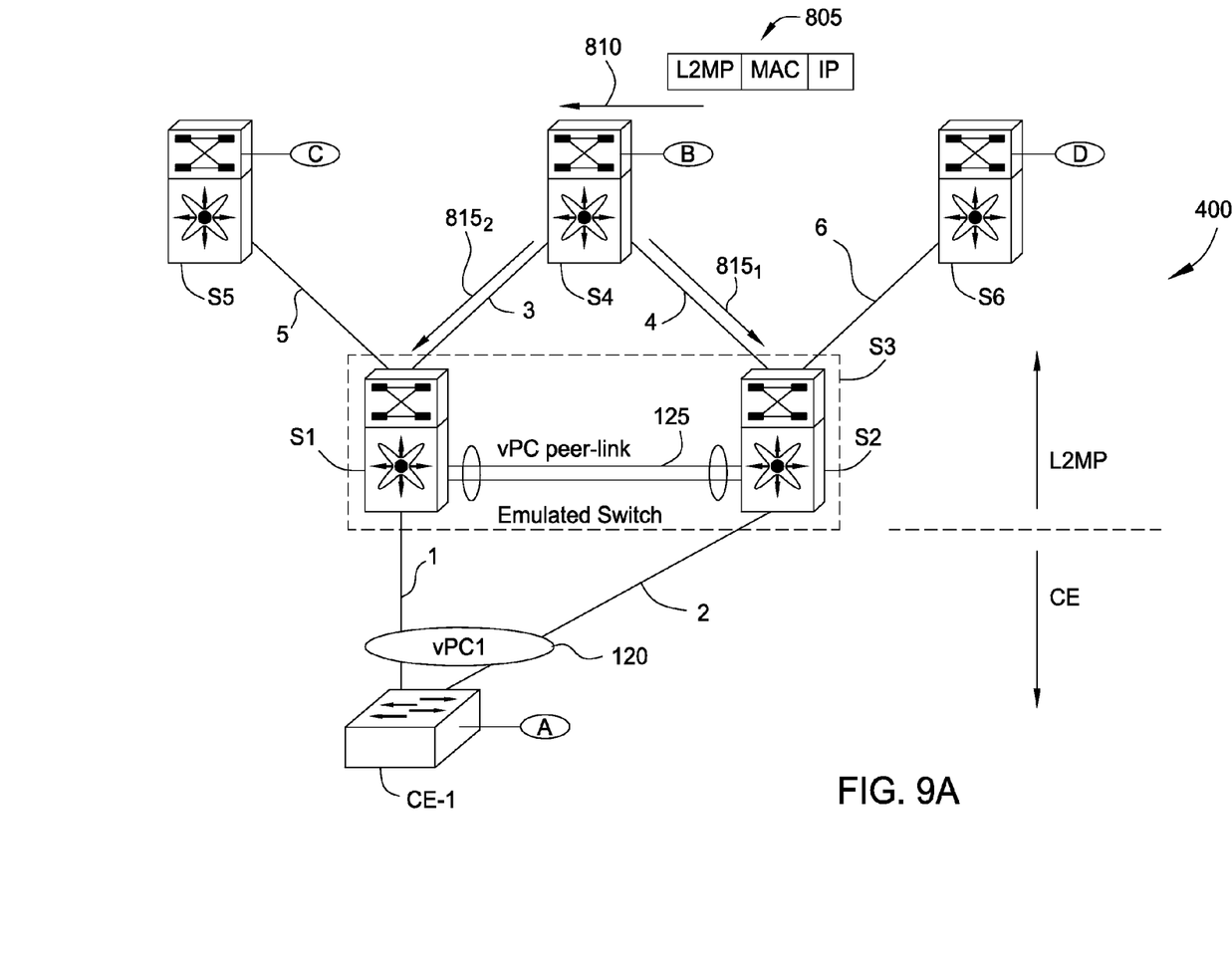
FIG. 9A-9B further illustrate the method of FIG. 8 using the example network computing infrastructure 400 connecting a CE device to an emulated switch in an L2MP network, according to certain embodiments of the present disclosure.
Figure 9B:
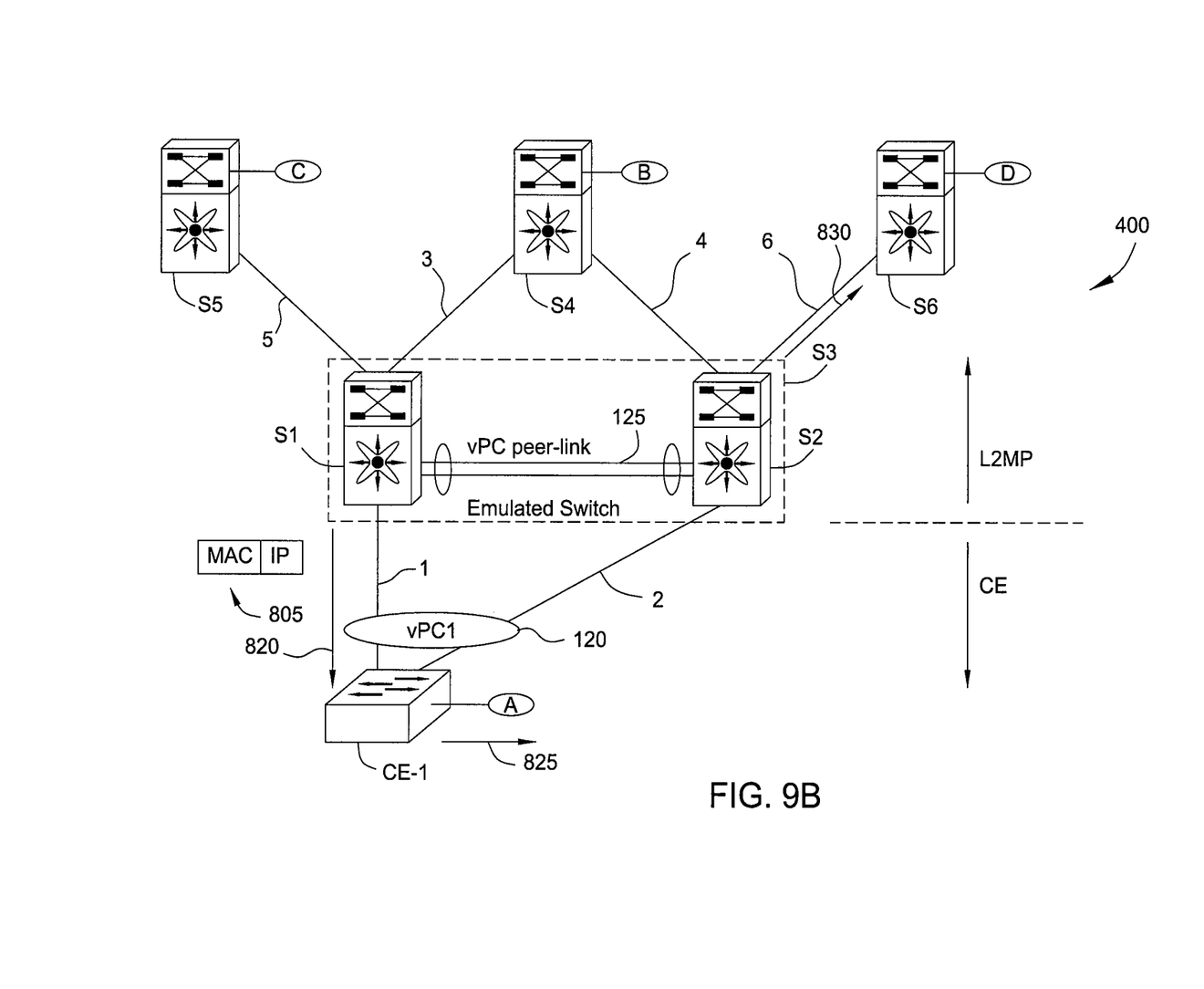

FIG. 9A-9B further illustrate the method of FIG. 8 using the example network computing infrastructure 400 connecting a CE device to an emulated switch in an L2MP network, according to certain embodiments of the present disclosure.

First, FIG. 9A shows a classical Ethernet switch CE-1 connected to an emulated switch S3 over a virtual port channel 120. Specifically, switch CE-1 is connected to peer switches S1 and S2 over links 1 and 2, respectively. Peer switches S1 and S2 include a peer link 125 to one another, as well as connections to other nodes in an L2MP network 400. AS shown, switch S4 includes two links to the emulated switch S3, one to peer switch S1 over link 3 and one to peer switch S2 over link 4. Assume host B (connected to switch S4) sends a frame 805 with a multi-cast destination address to a group of hosts which includes host A (connected to switch CE-1) and host D (connected to switch S6). An arrow 810 shows packet 805 sent to the switch S4. Upon receipt, the switch S4 forwards frame 805 over links 3 and 4 the vPC 120.

In this example, assume switch S4 sends the frame 805 over link 4 towards S2 (shown by an arrow $815_1$)in order to reach a host D attached to switch S6 and sends the frame 805 over link 3 in order to send the frame to emulated switch S3 (shown by an arrow $815_2$), which according to the forwarding table on switch S4 is accessible over link 3. In such a case, the frame 805 actually reaches S1 over link 3. That is, the frame 805 is received by both switch S1 and S2, having a multicast destination address behind CE-1, which is reachable over both links 1 (for switch S1) and 2 (for switch S2). However, as only one of switches S1 and S2 is the designated forwarder for the vPC link 120, only one switch forwards the frame 805 towards CE-1. FIG. 9B shows this result. In particular, FIG. 9B shows switch S1 forwarding the frame 805 towards CE-1 over link 1 (shown by an arrow 820). As the CE-1 is not an L2MP capable switch, the L2MP header is stripped off before being forwarded to switch CE-1. Once received by switch CE-1, frame 805 is forwarded to host A (shown by arrow 825). Additionally, an arrow 830 represents frame 805 being forwarded towards switch S6, where it is forwarded towards host D.

Note, in this example, frame 805 was sent towards switch S1, which is the designated forwarder in this example. However, multicast trees can be pruned by protocols such as IGMP so that for a multicast group, a packet from the cloud might reach only one of the emulated switch peers, which may not be the designated forwarder (e.g., switch S2). To address this issue, in one embodiment, for a host behind an emulated switch identifier, IGMP may be configured to send join requests from both the emulating switch peers, so that the traffic is attracted to both. Alternatively, the peer link of the emulated switches could be used to forward all packets to the other emulating peer, however, this also requires IIC entries for other sources (apart from emulated switch ID) to be enabled on the peer link, which may conflict with a forwarding graph calculated by IS-IS.

In sum, embodiments described herein provide techniques which facilitate multi-destination forwarding in a L2MP network which includes an emulated switch. The emulated switch may correspond to one or more underlying peer link switches in the L2MP network, in which each of the peer link switches is linked to a CE switch. Doing so prevents other switches in the L2MP network from flip/flopping MAC addresses as the CE switch sends traffic over different links of a virtual port channel (i.e., to the peer link switches). Northbound traffic received by one of the peer link switches over a vPC link is automatically forwarded to the other peer link switch. Doing so ensures that other switches in the L2MP network will receive multi-destination frames over at least one link that will satisfy an IIC check. Additionally, one of the peer switches is elected as a designated forwarder for southbound traffic. That is, multi-destination frames originating from the L2MP network addressed to hosts within the CE network are sent over only one of the peer link switches.

While the forgoing is directed to exemplary embodiments, other and further embodiments may be devised without departing from the basic scope thereof. For example, aspects of the present disclosure may be implemented in hardware or software or in a combination of hardware and software. One embodiment of the disclosure may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present disclosure, are embodiments of the present disclosure.

In view of the foregoing, the scope of the present disclosure is determined by the claims that follow.

We claim:

1. A method, comprising:
 receiving, from a Classical Ethernet (CE) switch, at a first peer link switch, a network packet having a multi-destination address as a destination address;

forwarding the network packet over one or more links connecting the first peer link switch to one or more nodes of a Layer 2 multipath (L2MP) network; and forwarding the network packet over a peer link connecting the first peer link switch to a second peer link switch, wherein the peer link provides a backplane link between the first peer link switch and second peer link switch, wherein the first peer link switch and the second peer link switch are each connected to the CE switch over a virtual port channel, wherein the second peer link switch is configured to forward the network packet over one or more links connecting the second peer link switch to one or more nodes of the L2MP network, wherein each of the one or more nodes of the L2MP network to which the network packet is forwarded is configured to perform an incoming interface check on the forwarded network packet, wherein the first peer link switch and the second peer link switch are configured as an emulated switch in the L2MP network, wherein one of the first peer link switch and the second peer link of the emulated switch is designated to forward network packets originating from the L2MP network and having a multi-destination address to the CE switch.

2. The method of claim 1, further comprising, appending a Layer 2 multipath network (L2MP) header to the network packet.

3. The method of claim 1, wherein the L2MP header includes at least an indication of a route identifier and an origination source switch ID corresponding to the emulated switch.

4. The method of claim 1, wherein the network packet is a Layer 2 Ethernet frame, wherein the multi-destination address is a multicast address.

5. The method of claim 1, wherein the network packet is received by the first peer link switch over the virtual port channel.

6. The method of claim 1, wherein the L2MP network is a TRILL network, wherein each of the nodes of the L2MP network, including the emulated switch, generates a forwarding graph according to an intermediate switch to intermediate switch (IS-IS) protocol.

7. A non-transitory computer-readable medium storing code for execution by a central processing unit (CPU), wherein the code, when executed by the CPU, performs an operation for processing network frames in a Layer 2 multipath (L2MP) network, the operation comprising:

receiving, from a Classical Ethernet (CE) switch, at a first peer link switch, a network packet having a multi-destination address as a destination address;

forwarding the network packet over one or more links connecting the first peer link switch to one or more switching nodes of the L2MP network; and forwarding the network packet over a peer link connecting the first peer link switch to a second peer link switch, wherein the peer link provides a backplane link between the first peer link switch and second peer link switch, wherein the first peer link switch and the second peer link switch are each connected to the CE switch over a virtual port channel, wherein the second peer link switch is configured to forward the network packet over one or more links connecting the second peer link switch to one or more nodes of L2MP network, wherein each of the one or more nodes of the L2MP network to which the network packet is forwarded is configured to perform an incoming interface check on the forwarded network packet, wherein the first peer link switch and the second peer link switch are configured as an emulated switch in the L2MP network, wherein one of the first peer link switch and the second peer link of the emulated switch is designated to forward network packets originating from the L2MP network and having a multi-destination address to the CE switch.

8. The non-transitory computer-readable medium of claim 7, wherein the operation further comprises, appending a Layer 2 multipath network (L2MP) header to the network packet.

9. The non-transitory computer-readable medium of claim 7, wherein the L2MP header includes at least an indication of a route identifier and an origination source switch ID corresponding to the emulated switch.

10. The non-transitory computer-readable medium of claim 7, wherein the network packet is a Layer 2 Ethernet frame, wherein the multi-destination address is a multicast address.

11. The non-transitory computer-readable medium of claim 7, wherein the network packet is received by the first peer link switch over the virtual port channel.

12. The non-transitory computer-readable medium of claim 7, wherein the L2MP network is a TRILL network, wherein each of the nodes of the L2MP network, including the emulated switch, generates a forwarding graph according to an intermediate switch to intermediate switch (IS-IS) protocol.

13. A system, comprising:

a first peer link switch comprising at least a processor and a memory, wherein the first peer link switch is configured to perform an operation for processing a network packet, the operation of the first peer link switch comprising:

receiving, from a Classical Ethernet (CE) switch, a network packet having a multi-destination address as a destination address, forwarding the network packet over one or more links connecting the first peer link switch to one or more nodes of a Layer 2 multipath (L2MP) network, and forwarding the network packet over a peer link connecting the first peer link switch to a second peer link switch, wherein the peer link provides a backplane link between the first peer link switch and second peer link switch, wherein the first peer link switch and the second peer link switch are configured as an emulated switch in the L2MP network, wherein one of the first peer link switch and the second peer link switch of the emulated switch is designated to forward network packets originating from the L2MP network and having a multi-destination address to the CE switch; and the second peer link switch comprising at least a processor and a memory, wherein the first peer link switch and the second peer link switch are each connected to the CE switch over a virtual port channel, wherein the second peer link switch is configured to perform an operation for processing the network frame received over the peer link, the operation of the second peer link switch comprising:

forwarding the network packet over one or more links connecting the second peer link switch to one or more nodes of the L2MP network, wherein each of the one or more nodes of the L2MP network to which the network packet is forwarded is configured to perform an incoming interface check on the forwarded network packet.

14. The system of claim 13, wherein the operation of the first peer link switch further comprises, appending a Layer 2 multipath network (L2MP) header to the network packet.

15. The system of claim 13, wherein the L2MP header includes at least an indication of a route identifier and an origination source switch ID corresponding to the emulated switch.

16. The system of claim 13, wherein the network packet is a Layer 2 Ethernet frame, wherein the multi-destination address is a multicast address.

17. The system of claim 13, wherein the network packet is received by the first peer link switch over the virtual port channel.

18. The system of claim 13, wherein the L2MP network is a TRILL network, wherein each of the nodes of the L2MP network, including the emulated switch, generates a forwarding graph according to an intermediate switch to intermediate switch (IS-IS) protocol.

19. A method, comprising:
- receiving, at a first Layer 2 multipath (L2MP) switch configured as a first peer in an emulated switch in an L2MP network having one or more nodes, a frame having a multi-destination address as a destination address, wherein the first L2MP switch is connected, via a peer link, to a second L2MP switch configured as a second peer in the emulated switch in the L2MP network, wherein the peer link provides a backplane link between the first L2MP switch and the second L2MP switch, wherein at least one host to which the frame is forwarded is reachable over a virtual port channel (vPC) connecting each of the first L2MP switch and the second L2MP switch to a Classical Ethernet (CE) device, wherein one of the first L2MP switch and the second L2MP switch of the emulated switch is designated to forward, to the CE device, network packets originating from the L2MP network and having a multi-destination address, wherein each of the one or more nodes of the L2MP network is configured to perform an incoming interface check on any received frame;
- upon determining the first L2MP switch is configured as a designated forwarder for the emulated switch for multi-destination traffic sent over the vPC, forwarding the frame over the vPC from the first L2MP switch towards the at least one host; and
- forwarding the frame to the second L2MP switch configured as the second peer in the emulated switch in the L2MP network.

20. The method of claim 19, further comprising:
- upon determining the first L2MP switch is not configured as the designated forwarder for multi-destination traffic sent over the vPC, dropping the frame.

21. The method of claim 19, further comprising:
- upon determining the second L2MP switch is configured as the designated forwarder for the emulated switch for multi-destination traffic sent over the vPC, forwarding the frame over the vPC from the second L2MP switch towards the at least one host.

* * * * *